June 9, 1925.  1,541,357
J. E. JOHNSON
APPARATUS FOR MOLDING
Filed Sept. 20, 1922    2 Sheets-Sheet 1

INVENTOR
Joseph E. Johnson
BY
Mitchell Brothers
ATTORNEYS

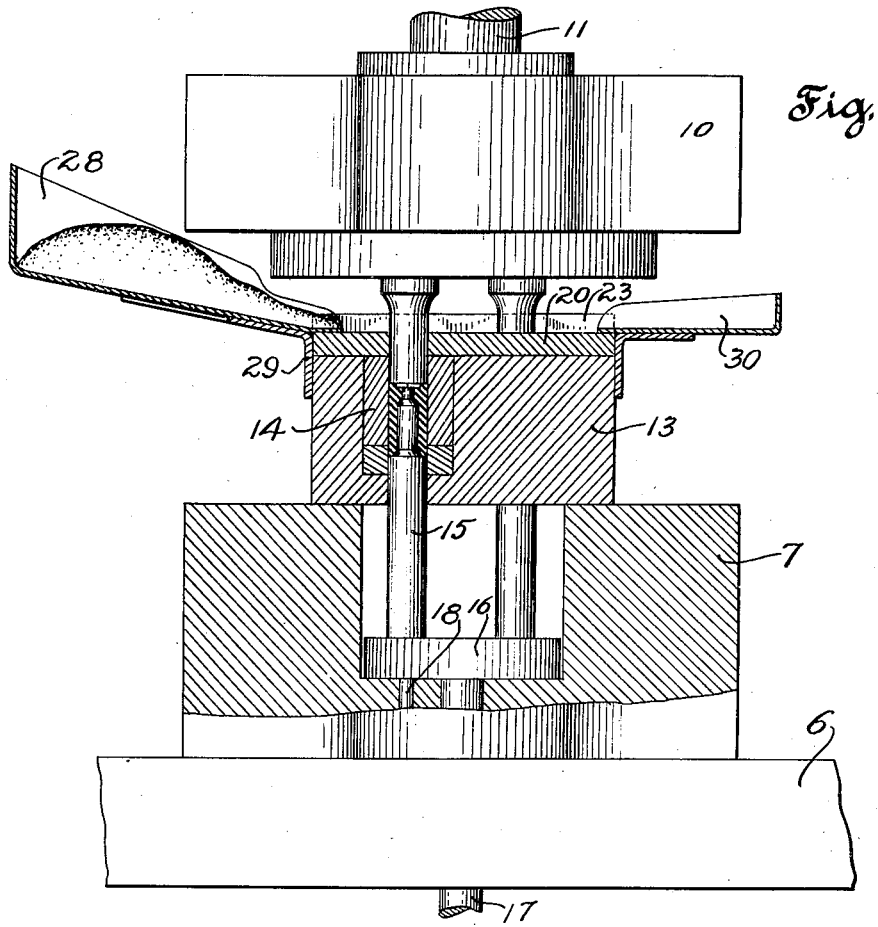
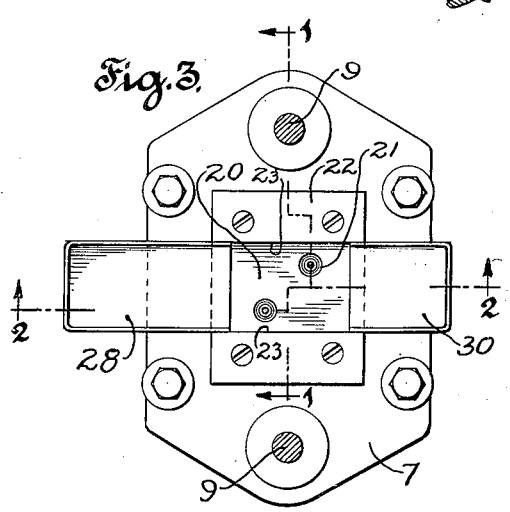
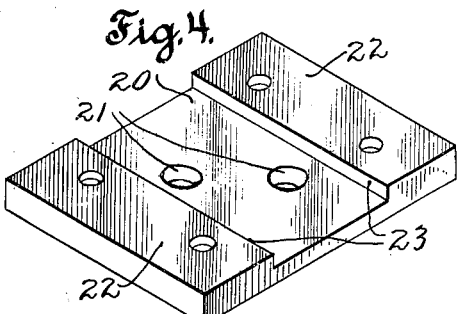

Patented June 9, 1925.

1,541,357

UNITED STATES PATENT OFFICE.

JOSEPH E. JOHNSON, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

APPARATUS FOR MOLDING.

Application filed September 20, 1922. Serial No. 589,293.

*To all whom it may concern:*

Be it known that I, JOSEPH E. JOHNSON, a citizen of the United States of America, residing at Meriden, Connecticut, have invented a new and useful Apparatus for Molding, of which the following is a specification.

My invention relates to apparatus for molding. The invention is particularly, though not exclusively, adapted for use with moldable compounds which are usually molded in a cold state, and which are substantially dry and in granular or porous form. A compound as disclosed in Cavanagh Patent No. 1,346,397, dated July 13, 1920, may be cited as an example of such a moldable compound. Parts formed of such compounds, at the present time, are used extensively in the electrical industries for small insulating parts, such as plugs, sockets, etc.

Heretofore, in molding articles of a compound such as indicated, it has been usual to form the mold cavity of a capacity greater than is required for the requisite amount of moldable compound for forming the molded article. In order to get the proper quantity of compound for each molded article, resort is had to hand or automatic weighing devices or to volumetric measuring means. These methods of determining the proper quantity for each article, and then pouring the predetermined quantity of compound into the mold cavity, is a slow process, since time is required for weighing out or measuring each individual charge, and great care must be exercised by the operator in order to get all of the compound out of the measuring device and into the mold cavity.

It is the principal object of my invention, therefore, to provide apparatus for forming molded articles whereby the requisite charge of moldable compound for each article may be rapidly and accurately supplied to the mold cavity.

It is a further object to provide novel means whereby the capacity of a mold cavity may be varied in order to form a cavity of any predetermined requiste capacity, and, in general, the object is to provide an improved apparatus for turning out molded articles rapidly and accurately.

Briefly stated, the preferred method of molding broadly includes, forming a mold cavity of such predetermined capacity that when filled substantially flush with the top it will contain the requisite amount of moldable compound for the article when molded, then filling the mold cavity with a moldable compound substantially flush with the top thereof, and then compressing the compound while in said mold cavity to form the molded article.

In the drawings, which show for illustrative purposes only preferred forms of apparatus for the accomplishment of the objects of my invention—

Fig. 2 is a view thereof taken substantially in the plane of the line 2—2 of Fig. 3;

Fig. 3 is a plan view, on a relatively reduced scale, of the lower portion of a molding press, disclosing features of my invention:

Fig. 4 is a detail perspective view of a plate for increasing the capacity of a mold cavity.

Figures 1, 5:
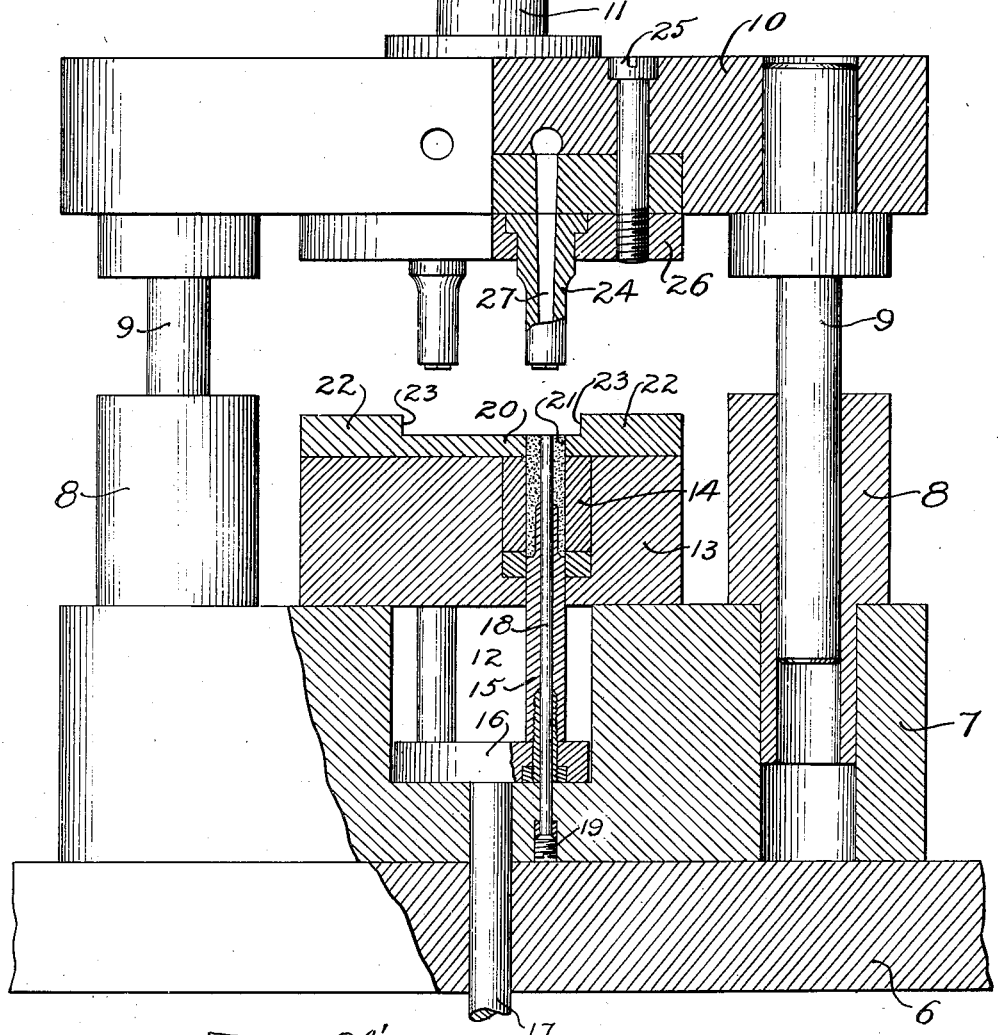
Figure 1 is a fragmentary side view of a molding press embodying features of my invention, and taken substantially in the plane of the line 1—1 of Fig. 3.
Fig. 5 is a fragmentary sectional view illustrating a modification.

In said drawings, 6 indicates conventionally the base portion of a molding press. A platen 7 is seated thereon and, in the form shown, the platen is provided with guide bushings 8—8 for receiving guide plungers 9—9, which are slidable in the bearings 8—8. A holder plate 10 is mounted on the guide plungers 9—9, and the holder plate may be reciprocated, as by means of a hydraulic plunger 11. In the form shown the platen 7 is recessed, as at 12, and supported above the recess 12 is a block 13 carrying a die jacket 14, which forms a part of the mold cavity. A die pad 15 co-operating with the die jacket 14 defines the bottom of the mold cavity. In the form shown the die pad 15 is fixedly supported on a plate 16, seating in the bottom of the recess 12. The plate 16 and pad 15 may be reciprocated by means of a plunger 17, for ejecting the molded article, as will be later described.

In the specific form of die disclosed for molding a certain specific article, the die pad 15 has a longitudinally-extending aperture therethrough, through which a pin 18 passes. This pin 18 may be fixedly secured to the platen 7, as indicated at 19.

The mold cavity for forming any specific article should be, in accordance with my invention, of such predetermined capacity as to contain the proper quantity of moldable compound when filled substantially flush with the top of the cavity. It is usually more convenient to form the die cavity in the jacket 14 of a depth slightly less than the requisite depth, as above indicated. In order to form the cavity of the proper predetermined depth a plate 20, having an aperture 21 therein, communicating and registering with the die cavity, is secured to some member, such as the block 13. In the form shown the plate 20 is secured above the top of the die jacket and forms what I may term a filler plate. Means are provided for retaining the moldable compound which is passed over the filler plate, as will be later described, and I have therefore indicated the filler plate 20 as provided with extensions 22—22, defining retaining flanges or walls 23—23. This plate, in the present disclosure, is a solid plate having a passage or filler groove therein, so as to form a pan-shaped member, the aperture 21 being located in the bottom of the groove and the sides of the groove forming the retaining walls 23—23.

A suitable die punch 24 may be secured to the holder plate 10 by means of screws, such as 25, and retainer 26. When the parts are adjusted for operation, the die punch 24 should, of course, register with the die cavity, as is indicated in the drawing. In the form shown the die punch is provided with an aperture 27 extending therethrough, this aperture being formed to receive the pin 18 passing through the die pad, the article to be molded with this specific arrangement being, of course, formed with a hole therethrough formed by the pin 18.

The molding machine shown is adapted for molding two articles at one operation, but since the two mold cavities and other parts are duplicates of each other, a description of one set of parts only need be given. The number of mold cavities and associated parts is, of course immaterial so far as concerns the invention.

A hopper 28 for moldable compound is supported adjacent the die cavity in any suitable manner and, in the present disclosure, has been conventionally shown as supported from the block 13 by means of the angle 29. The sides of the hopper 28 preferably abut or fit between the retaining walls or flanges 23 of the die block or filler plate, so that the two flanges and side walls of the hopper prevent spilling of the moldable compound when the latter is passed over the die cavities, as will be later described. At the side opposite the hopper 28 there may be positioned a secondary hopper 30, the sides of which likewise preferably extend between the retaining walls or flanges 23—23. By this arrangement it will be seen that the two hoppers and the retaining walls or flanges form a continuous wall substantially enclosing the die cavity, so that spilling of the moldable compound will be prevented.

The operation and carrying out of the method of molding may be as follows:

The die punch and die cavity are separated from each other. Suitable inserts (if inserts are used) are placed on the die pad or die punch, or both. Moldable compound is next supplied to the die cavity by a tool, such as a small hoe, by means of which material from the hopper 28 is raked over the mold cavity until the latter is full. The excess material is scraped off substantially flush with the top of the mold cavity and, as previously explained, the latter has been made of such predetermined capacity that, when filled substantially flush with the top, just the proper quantity of material will be held therein to form a complete molded article. It will be seen that the material may be raked toward the right, as viewed in Fig. 2, and any surplus may, if desired, be raked into or caught by the hopper 30, this material preferably being forced toward the left for the next filling operation.

When the die cavity has been filled, suitable mechanism (not shown) is actuated to cause the descent of the die punch into the die cavity, where the moldable compound is compressed to form the finished molded article. After the article has been thus formed the die cavity and die punch are again separated, and suitable mechanism (not shown) is actuated to cause the plunger 17 and the plate 16 carrying the die pad 15 to be moved relatively to the mold cavity, in order to eject the molded article. After the molded article has been removed inserts may be placed on the die pad (if inserts are used), and the die pad is again lowered to the position shown in Fig. 1, and the filling operation again repeated.

It will be seen that by the above method no separate operation of weighing or measuring the compound before filling into the die cavity is required. Furthermore, but slight skill is required in order to get the proper quantity of moldable compound into the die cavity. Articles produced by this method will be uniform and of a high degree of excellence.

If the moldable compound is to be changed, and the same presents different characteristics, it may be necessary to change the capacity of the mold cavity. Such varying of the capacity of the mold cavity is a relatively simple operation since, by applying a filler plate of different thickness, the depth of the mold cavity will be by that amount correspondingly varied.

It often happens that molded articles are made which are considerably thicker at one part than at another part, and unless the material in the die cavity flows freely under compression, the article at the thinner part may be of greater density than at the relatively thicker part, and pins projecting from the die pad or punch are likely to be broken. In order to secure substantially uniform density, I have devised means for supplying additional material to the mold cavity at a point corresponding to the thicker part of the molded article. In Fig. 5 I have disclosed a die jacket 14' and a die pad 15', the latter being formed to mold an article which is thicker at the left side, as viewed in Fig. 5, than at the other side, the die punch 24' being flat on the bottom. In order to provide additional moldable compound at a point corresponding to the thicker part of the molded article, the upper edge of the cavity (in this case the upper edge of the filler plate 20') is relatively irregular, and the upper edge over the thicker part of the molded article is at a higher elevation than the remainder, in order that when the moldable compound is supplied to the cavity and scraped off substantially flush with the upper surface thereof, an additional quantity of compound will be supplied at the thicker part of the molded article.

It will be observed that I have not disclosed heated or cooled dies, since such heated or cooled dies are well known in the art, and therefore do not appear to require illustration, and the invention is not limited to any particular character of die, whether or not heated or cooled.

While I have disclosed specific embodiments of apparatus herein, I do not wish to be limited thereto, since changes may be made within the scope of the appended claims.

I claim:

1. In a device of the character described, a mold block including a plurality of members rigidly secured together and having registering apertures therein for forming a mold cavity, the top member having an extended substantially flat surface flush with and surrounding the top of said cavity for holding moldable compound to be introduced into said cavity.

2. In a device of the character described, a mold block having a mold cavity therein, a plate rigidly secured to said block and having an aperture registering with said cavity and forming a part thereof, said plate having an extended substantially flat surface flush with and surrounding the aperture therein for holding moldable compound to be introduced into said cavity.

3. In a device of the character described, a mold block having a mold cavity therein, a filler plate applied to the upper side of said mold block and having an aperture therein communicating with the mold cavity whereby the depth of said mold cavity is increased by the thickness of said plate adjacent the aperture, said mold cavity being of a depth sufficient to contain the requisite quantity of moldable compound for forming a molded article, said filler plate having upstanding flanges for retaining moldable compound on the upper face thereof, and means for pressing the moldable compound while in said mold cavity.

4. As an article of manufacture, means for increasing the depth of a mold cavity in a mold block, comprising a plate having an aperture therein for communication with the cavity in a mold block, said plate having means for preventing the spilling of compound deposited thereon.

5. As an article of manufacture, a member for increasing the depth of a mold cavity comprising a plate for attachment to a mold block and having an aperture therein for communication with a mold cavity in a mold block, said plate having a substantial lateral surface adjacent the aperture.

6. As an article of manufacture, a member for increasing the depth of a mold cavity in a mold block, comprising a plate having an aperture therein for communication with the cavity in a mold block, said plate having upstanding flanges thereon.

7. As an article of manufacture, a member for increasing the depth of the mold cavity in a mold block, comprising a grooved plate, said plate having an aperture in said groove for registry with the mold cavity in a mold block.

8. In a device of the character described, a member having a mold cavity therein of a capacity to contain the requisite quantity of moldable compound for a molded article when the compound is scraped off substantially flush with the upper side of the cavity, the upper surface of the member defining the cavity being at a higher level at one side than at the other, and means for pressing a moldable compound while in said cavity.

9. In a device of the character described, for molding an article thicker at one part than at another, a member having a mold cavity therein of a depth to contain the requisite quantity of moldable compound for a molded article when the compound is scraped off substantially flush with the upper edge of said cavity, the upper edge of said cavity being at a higher elevation at the part over the relatively thicker part of the molded article, and means for pressing the moldable compound while in said cavity.

10. As an article of manufacture, a filler plate for co-action with a mold cavity, wherein an article thicker at one part than at another is molded, said filler plate having an aperture therethrough for registry with a mold cavity, said plate at the portion defining said aperture therethrough being thicker at one part than at another.

JOSEPH E. JOHNSON.